United States Patent [19]

Diggs

[11] 4,035,658
[45] July 12, 1977

[54] HIGH POWER WIND TURBINE WITH KINETIC ACCUMULATOR

[76] Inventor: Richard E. Diggs, P.O. Box 776, Carthage, Mo. 64836

[21] Appl. No.: 576,984

[22] Filed: May 13, 1975

[51] Int. Cl.² .................... F03D 9/00; H02P 9/04
[52] U.S. Cl. ................... 290/55; 290/4 R; 290/44
[58] Field of Search ....... 290/4 R, 4 A, 4 B, 42–45, 290/54, 55; 322/4; 310/73, 112, 113; 318/150, 161

[56] References Cited

U.S. PATENT DOCUMENTS

| 554,138 | 2/1896 | Negbaur et al. | 290/44 |
|---|---|---|---|
| 1,936,233 | 11/1933 | Groves | 290/55 X |
| 2,112,633 | 3/1938 | Moon | 290/55 X |
| 2,517,135 | 8/1950 | Rudisill | 290/44 |
| 2,547,636 | 4/1951 | Fumagalli | 290/44 |
| 3,543,518 | 12/1970 | Shibata | 290/4 |
| 3,609,426 | 9/1971 | Gaul | 290/4 UX |
| 3,730,643 | 5/1973 | Davison | 290/55 X |
| 3,743,848 | 7/1973 | Strickland | 290/44 X |
| 3,902,072 | 8/1975 | Quinn | 290/55 X |
| 3,944,840 | 3/1976 | Troll | 290/55 |

Primary Examiner—James R. Scott
Attorney, Agent, or Firm—Oblon, Fisher, Spivak, McClelland & Maier

[57] ABSTRACT

A high power wind turbine with kinetic accumulator is disclosed. The invention includes a circular wall, a wall turbine movably mounted to the circular wall so that it can be moved to face the wind, a non-linear generator connected to the wind turbine to generate electrical power, a fly wheel, and a drive wheel disposed in contact with the fly wheel to drive the fly wheel. A reversible non-linear motor is connected to the drive wheel to drive the drive wheel or to be driven by the drive wheel. The non-linear generator is connected to the reversible motor to rotate the drive wheel to rotate the fly wheel when the non-linear generator generates excess electrical power. The fly wheel rotates the drive wheel to drive the reversible motor to generate electrical power when the non-linear generator does not generate sufficient electrical power.

32 Claims, 17 Drawing Figures

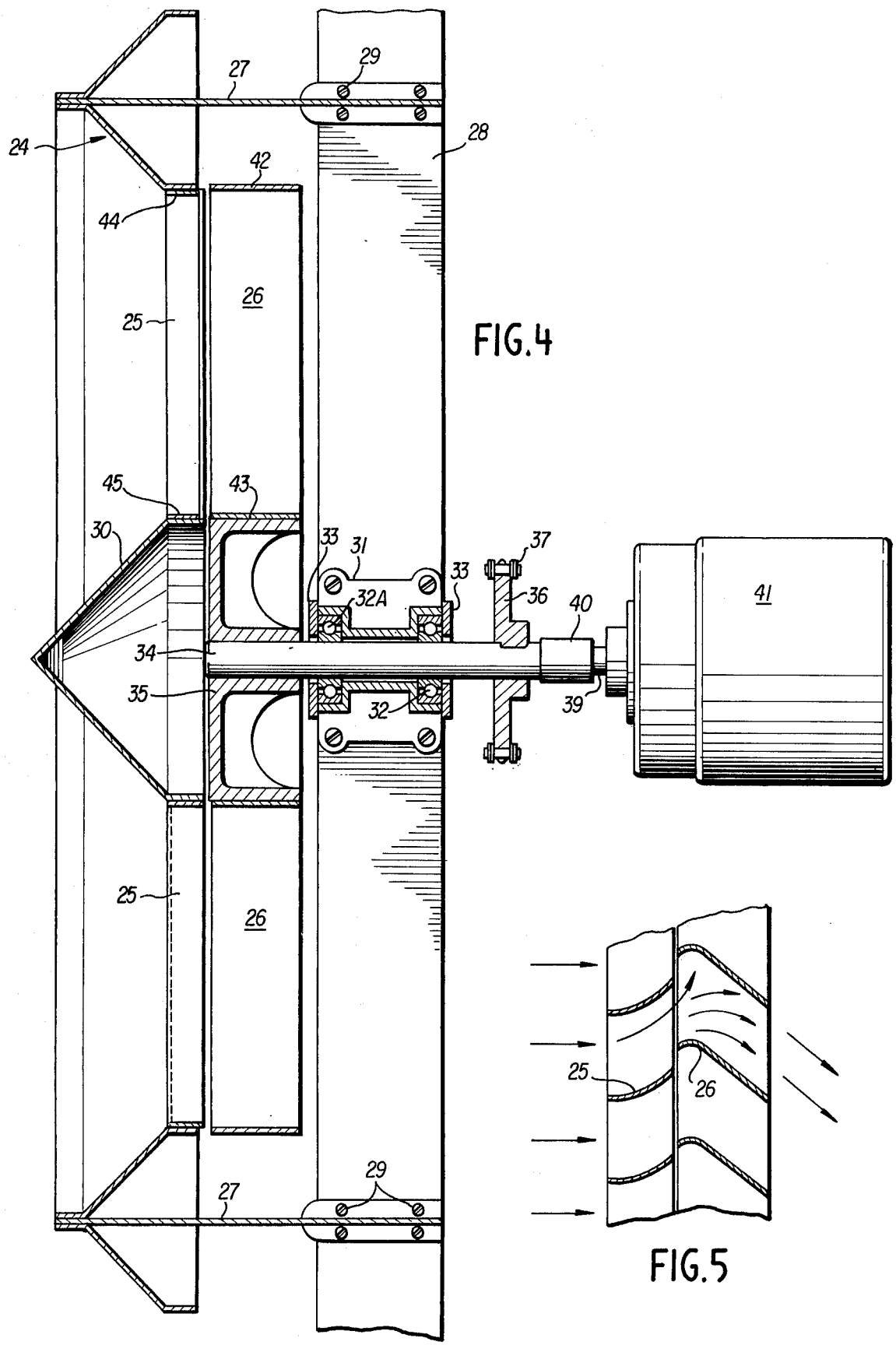

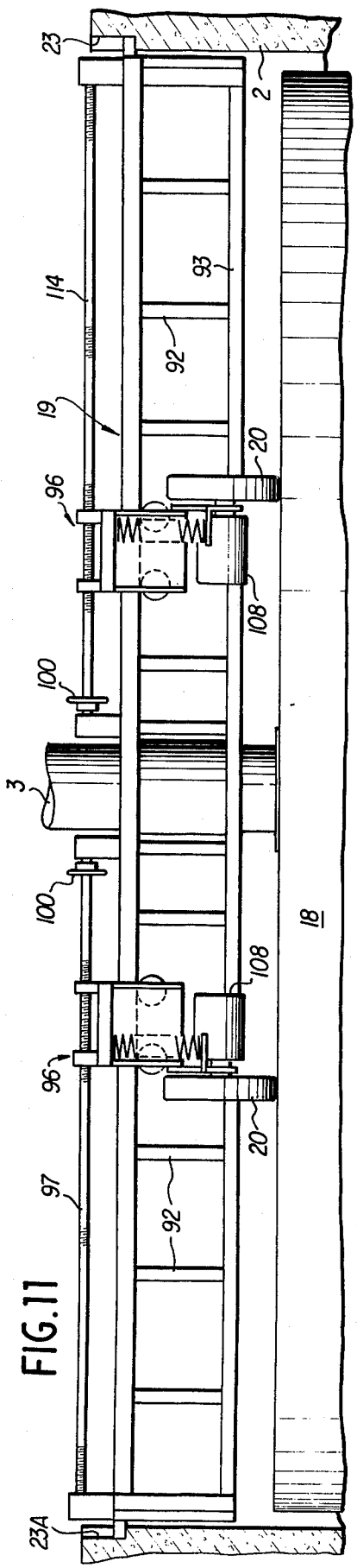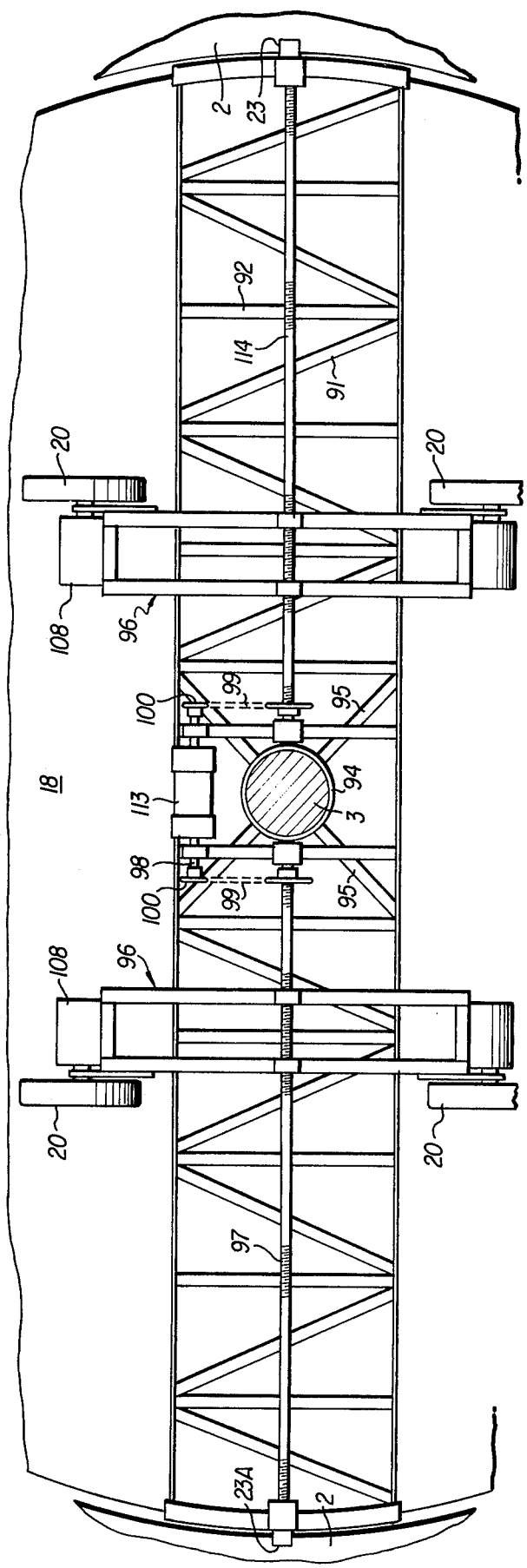

HIGH POWER WIND TURBINE WITH KINETIC ACCUMULATOR

BACKGROUND OF THE INVENTION

1. Field of the Invention

This invention relates to the world-wide effort to develop power sources that are not dependent upon hydrocarbon fossil fuels. More particularly, this invention relates to a high power wind turbine with a kinetic accumulator.

2. Description of the Prior Art

Wind is a substantial source of power. However, wind is not a consistent source of power in that it blows at rather high rates at times and at other times is almost completely calm.

Previous efforts to accumulate energy generated by wind power have been generally unsuccessful because such previous efforts have been directed to the generation of 60 cycles current at constant speed.

The following prior art was uncovered by applicant during a patentability search:

| Pat. No. | Patentee | Date of Issue |
| --- | --- | --- |
| 3,609,426 | Gaul | September 28, 1971 |
| 3,222,533 | MacKay | December 7, 1965 |
| 2,563,279 | Rushing | August 7, 1951 |
| 2,547,636 | Fumagalli | April 3, 1951 |
| 2,517,135 | Rudisill | August 1, 1950 |
| 2,112,633 | Moon | March 29, 1938 |
| 1,936,233 | Groves | November 21, 1933 |
| 684,054 | Fuqua et al. | October 8, 1901 |

SUMMARY OF THE INVENTION

It is, accordingly, an object of the present invention to make wind power commercially profitable by providing a mechanism that is highly efficient in developing electrical energy from wind power.

It is a further object of the present invention to provide a device that is very low in initial investment in relationship to the total power which it can produce.

It is a further object of the present invention to provide apparatus that overcomes the undependability of wind with the capability of being able to store as much as three or four days supply of energy to be used during the time when the wind is not blowing or to be used as peaking power as the case may demand.

It is a further object of the present invention to provide an inexpensive and efficient high power wind turbine of simple design.

It is a further object of the present invention to provide a high power wind turbine with kinetic accumulator which is not limited to the generation of 60 cycle current at a constant speed.

The foregoing and other objects are attained in accordance with one aspect of the present invention through the provision of a high power wind turbine with kinetic accumulator comprising a circular wall, a wind turbine movably mounted to the circular wall so that it can be moved to face the wind, a non-linear generator connected to the wind turbine to generate electrical power, a fly wheel, a drive wheel disposed in contact with the fly wheel to drive the fly wheel, a reversible non-linear motor connected to the drive wheel to drive the drive wheel or to be driven by the drive wheel, the non-linear generator being connected to the reversible motor to rotate the drive wheel to rotate the fly wheel when the non-linear generator generates excess electrical power, the fly wheel rotating the drive wheel to drive the reversible motor to generate electrical power when the non-linear generator does not generate sufficient electrical power.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 4 is a cross sectional view of an individual turbine module.

FIG. 5 is a cross section of the directional vanes and the turbine wheel vanes.

FIG. 11 is a side elevational view of the main frame utilized to support the drive wheels.

FIG. 14 is a top view of the drive wheel supporting means frame showing the manner of simultaneous rotation of the two lead screws.

DETAILED DESCRIPTION OF THE PREFERRED EMBODIMENTS

Figure 1:
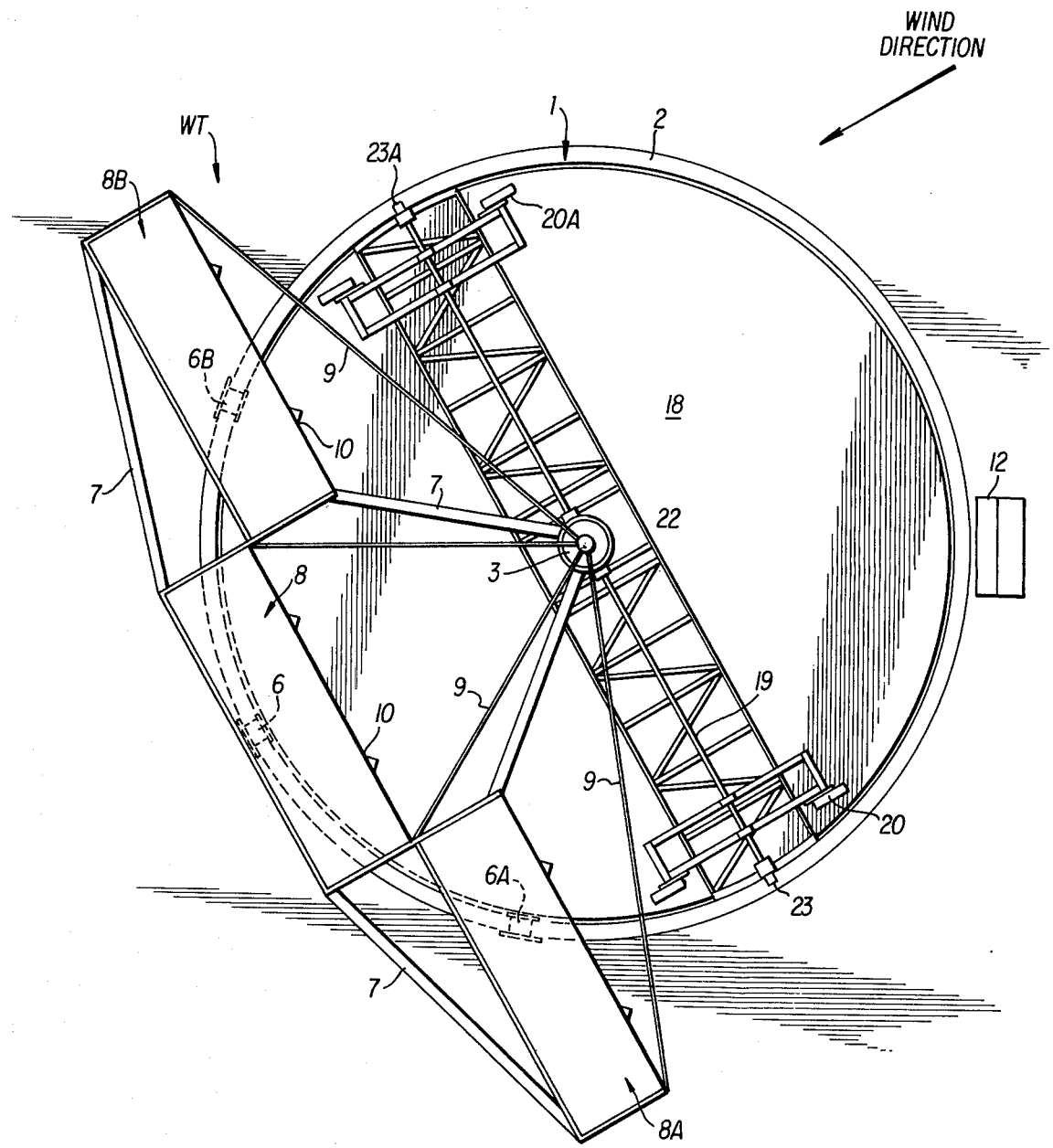
FIG. 1 is a top view of the wind turbine complex of the invention.
Figure 2:
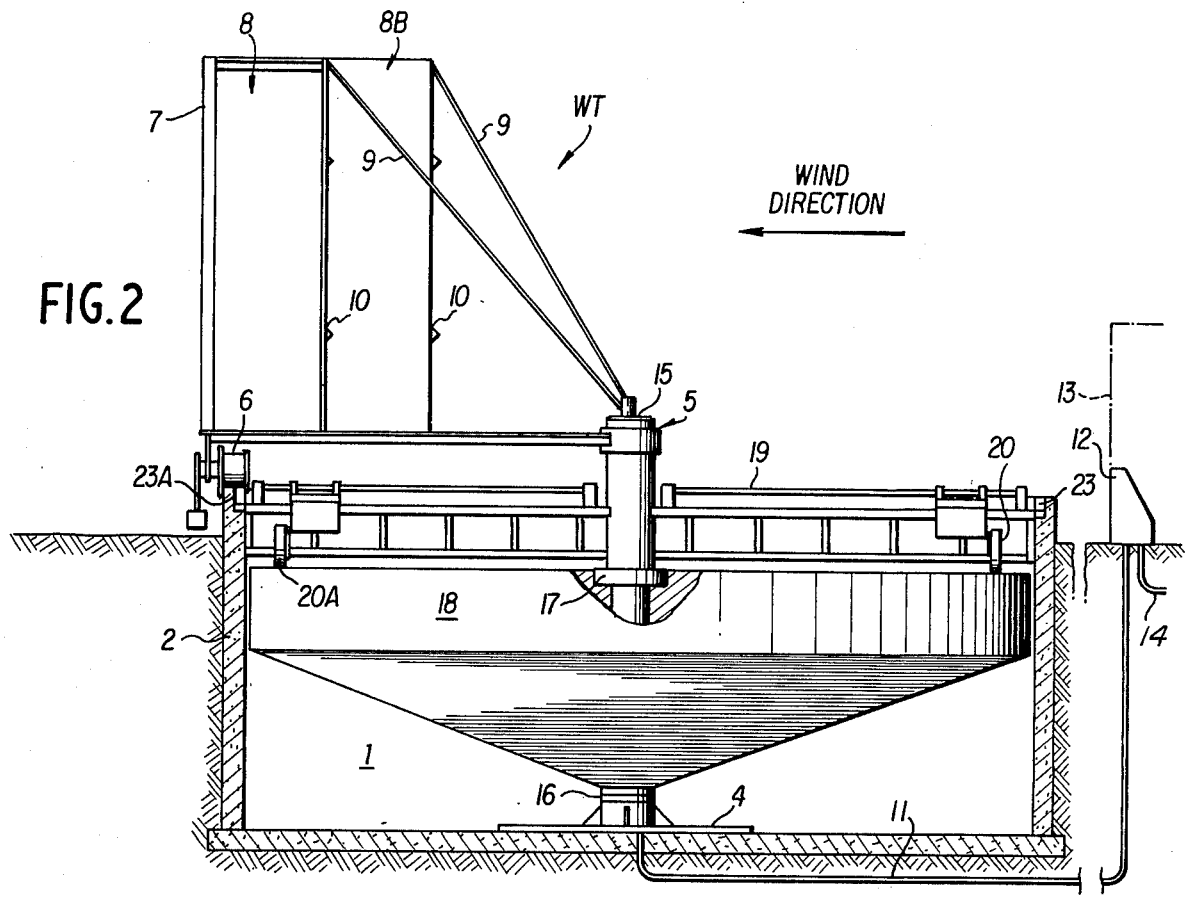
FIG. 2 is a cross sectional schematic of the side elevational view of the wind turbine and the kinetic accumulator of the present invention.

Referring now to the drawings, wherein like reference numerals designate identical or corresponding parts throughout the several views, and more particularly to FIGS. 1 and 2 thereof, the complete complex is identified as wind turbine WT which consists of an excavated pit 1 that has both a concrete floor and a concrete circular wall 2. A centrally located riser 3 is flanged to the concrete floor to provide a pivot 5 for the three turbine modules 8, 8A and 8B. Each mounting has four individual wind turbines 10. The three modules are assembled and carried in a frame 7 which is supported by three wheels 6, 6A and 6B which ride on the rim of the concrete circular wall 2.

The three support wheels have constant acting brakes so that the wind module can always be facing directly into the wind but will not be subject to wild oscillations caused by fishtailing winds. The modules and frames are anchored and braced by cables 9 to resist high winds, when and if they should occur.

The electricity generated by the unit is carried through a collecting ring 15 at pivot 5 through the riser 3 and through the exit cable 11 to a control panel 12 in station 13 and then through the exit power line 14 to a point of electrical use.

A very larger, heavy disc 18 of reinforced concrete, cast iron or other material is suspended on riser 3 with thrust bearing 16 and radial bearing 17. This large fly wheel 18 is free to rotate about the riser 3 on the bearings and is dynamically balanced so that it can rotate at a high rate of speed absorbing a substantial amount of kinetic energy. This is accomplished through drive wheels 20 and 20A which are electrically driven by any excess energy produced over the immediate need by the wind turbine. The wheels are threaded or slidably arranged on the extended shaft 19 which pivots at point 22 around the riser and is adjustable up and down in notches 23 and 23A in the circular wall. The two drive wheels are pushed downward at equal pressure so that the fly wheel 18 will operate in a stabilized condition.

The electric wheels 20 and 20A begin driving the fly wheel 18 located on its outer upper periphery; as the fly wheel 18 gains speed and momentum it will reach a point that the electrical motors can no longer input additional energy into it at the speed that they are running and therefore they are moved towards the center of the fly wheel by the controls of control box 12 until they reach a point where they are directly positioned adjacent to the riser 3. By this time they have spun the fly wheel up to a very great RPM and a very large horsepower.

It is anticipated that the whole compartment and pit and fly wheel will operate in a near vacuum condition to reduce the friction loss of the fly wheel running in air.

Should a point be reached where more power is needed in line 14 than the turbine modules are putting out at that particular moment, the electric wheels will generate electricity from the momentum of the fly wheel 18 and transmit this additional energy into line 14; or should the wind die completely, the wheels can operate against the turning momentum and kinetic energy of the fly wheel until the energy stored in the fly wheel is exhausted, at the rate required by line 14.

Figure 3:
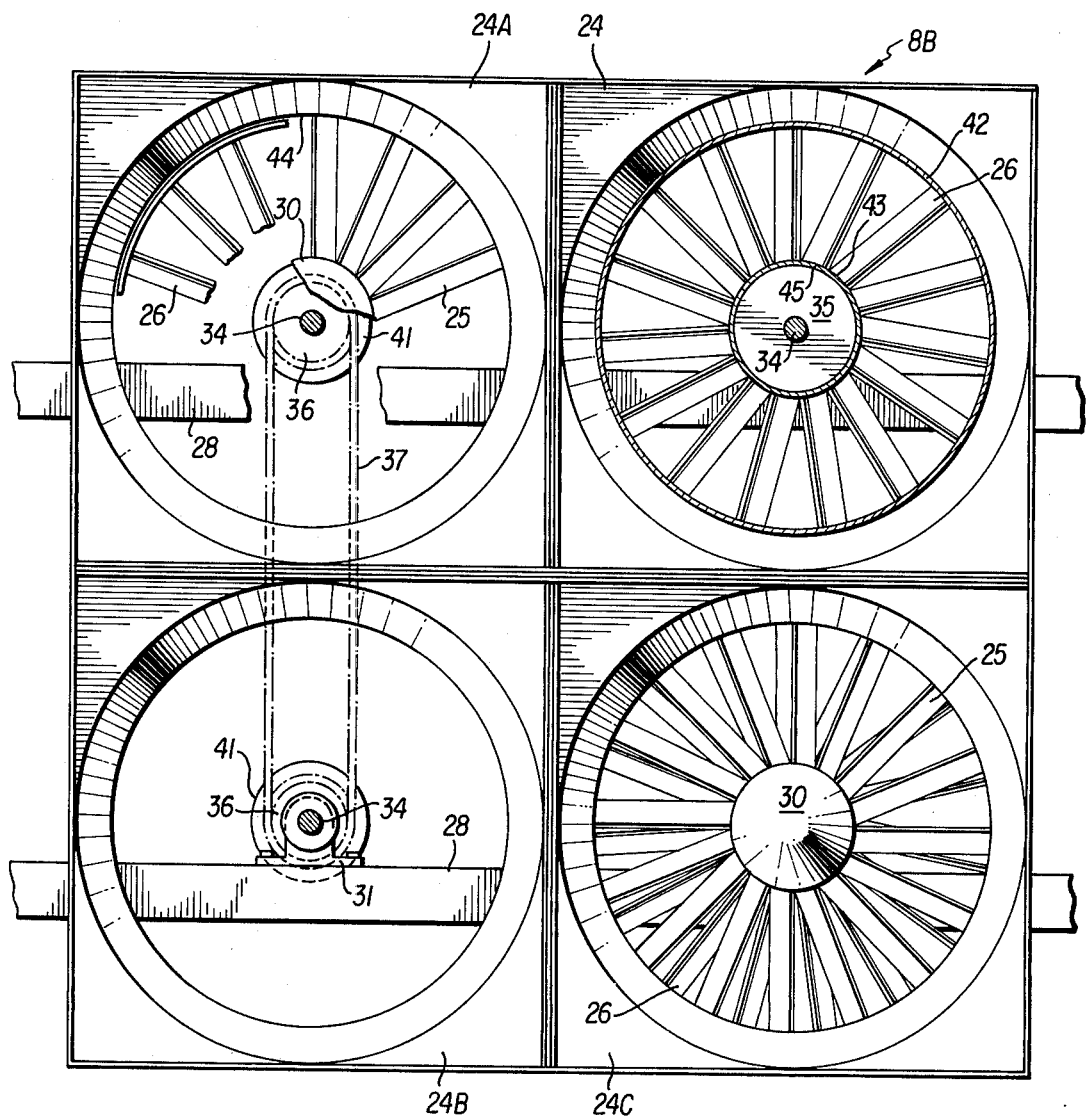
FIG. 3 is a more detailed face view of the turbine module with four individual turbines.

FIG. 3 is a face view of the 8B module which encloses four wind turbine units. The face of each unit is composed of a wind directional cowling 24, 24A, 24B and 24C. These are all identical and slope in from the top edges at a 45° angle or more to the edge of the directional spin vanes 25 which, as shown in FIG. 5, change the direction of the wind to a 45° angle to impinge directly on the pocket of the wind turbine buckets 26. This arrangement develops the maximum amount of energy in the smallest possible space to obtain a profitable and efficient machine for electrical power production from the wind.

As best shown in FIG. 4, the wind cowlings 24 are mounted on a bracket 27 which is attached to a main frame 28 at bolt hole points 29. Also attached to the main frame is the main bearing bracket 31 which holds two tapered bearings under bearing caps 33 and shims to maintain an axial and radial running tolerance on shaft 34 which carries the turbine wheel 26 on one end and on the other end the sprocket 36, chain 37 and coupling 40 to drive the shaft 39 of the non-linear electrical generator 41.

The directional vanes 25 are constructed with an inner ring 45 and an outer ring 44 into which the vanes are welded in the form as best shown in FIG. 5. The center directional cap 30 is then securely anchored by bolts or clips to the ring 45; again to direct the maximum amount of wind pressure into the turbine wheel 26.

The turbine wheel consists of an outer hoop 42, pressed aluminum blades 26 and a hub 35 to which the pressed vanes are welded at point 43 and at point 42. The whole unit is machined and balanced so that it will be able to run at high speed and under high torque loads. It is keyed to set to shaft 34 through hub unit 35 which is balanced aluminum casting.

By utilization of chain drives between the units, all four turbine wheels drive one single electrical generator for each module. A module of course can contain anything from one to perhaps as many as one dozen turbine wheels, and of course the units can be as little as 5 foot in diameter to as much as 10 or 12 foot is diameter and still maintain an efficient and balanced wheel.

As visualized in the drawings, this unit would be from 50 foot to 60 foot wide and from 15 foot to 20 foot high and would be capable of developing from 40 to 50 hp continuously on the average under moderately windy conditions which are prevalent in large sections of the country. There are 20 or 30 high wind areas where the horsepower would exceed 150 for a unit of this size. Further, the design is extremely simple, the components can be fabricated from standard stamped and welded items plus a few casting and the apparatus is subject to mass production and automated control.

Figure 6:
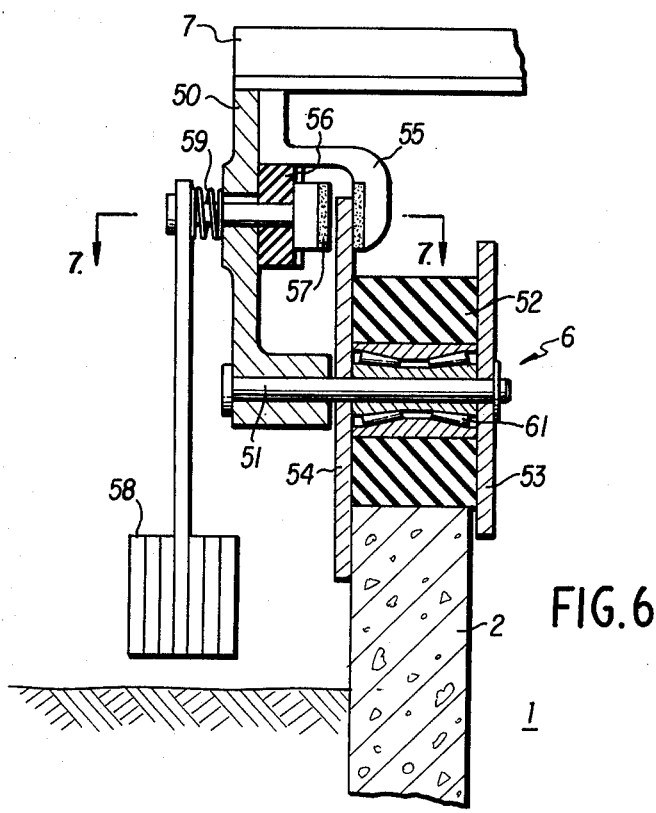
FIG. 6 shows the brakes associated with the wheels that allow the unit to rotate into the direct face of the wind.

FIG. 6 shows the brakes that are associated with the three wheels that allow the complete unit to rotate into the direct face of the wind. 1 is the pit, 2 is the pit wall and its top track and 7 is the main frame as shown in FIGS. 1 and 2. A frame to axle support 50 holds the wheel axle 51 on which the wheel 6 is mounted utilizing a large needle bearing 61.

The wheel consists of a solid rubber tire 52, an inside steel guide flange 53 and a larger outside diameter guide flange 54 on which a braking mechanism consisting of a pendulum design with a cam action is used to prevent rapid movement and swinging of the device in fishtailing winds.

A constant drag brake 55 runs on the interface of the steel guide flange 54. A secondary camming brake 57 is mounted through a cam pad 56 to which a pendulum weight 58 is attached. Any time that the unit makes a rapid motion from wind thrust on one side or the other, the pendulum will cam and grip the guide flange 54 to restrict oscillatory motion. This provides a constant braking motion that allows the unit to be faced directly into the wind at all three yet cuts down wild oscillations that would tend to damage the unit.

Figure 7:
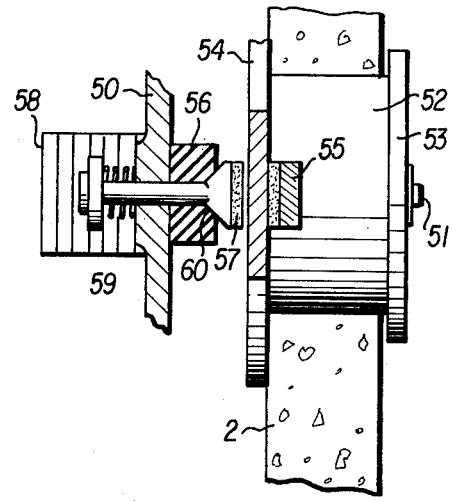
FIG. 7 shows a cutaway top view of the cam pad, brake face, and cam spring which keeps the brake retracted except when the pendulum is accelerated.

FIG. 7 is a top view in cutaway of the cam pad 56, brake face 57 and cam spring 59 which keeps the brake retracted except during pendulum acceleration.

Figure 8:
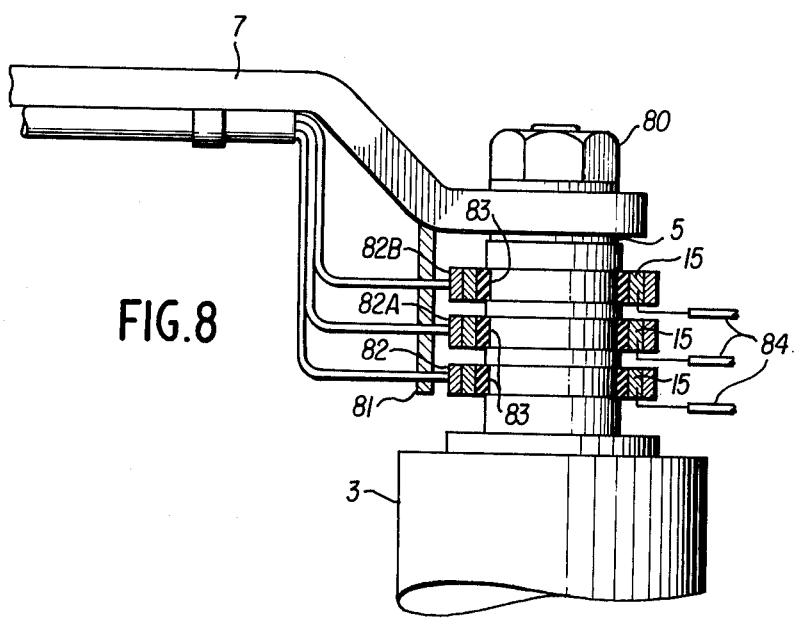
FIG. 8 is a more detailed view of the electrical connection on pivot 5.

FIG. 8 shows further details concerning the riser 3 and the pivot 5 which is the main connection and thrust load member for the frame member 7. The collecting rings are shown in detail. The frame is held in place at its pivot point by pivot nut 80. The frame supports a bracket 81 that can be referred to as a carbon holder; 82, 82A and 82B are three sets of slip rings mounted on insulator 83 on the pivot 5 so that electricity from the non-linear generators may be transmitted from the generative site through wires 84 through the carbon brush slides 85.

Figure 9:
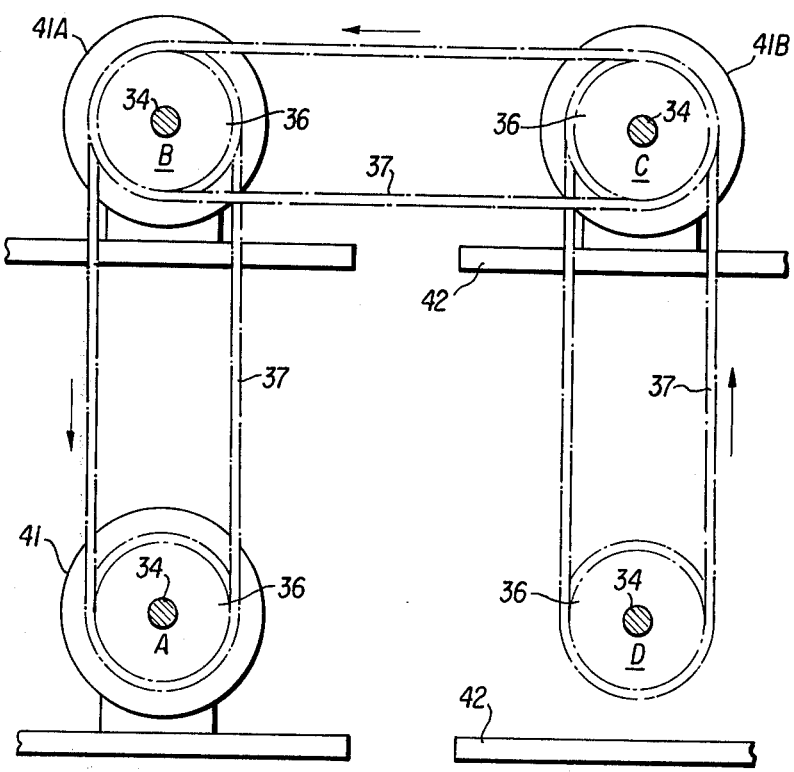
FIG. 9 is a view of the roller chain interconnections between a plurality of turbines.
Figure 10:
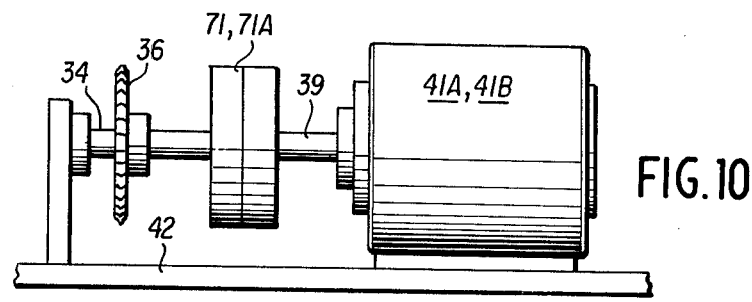
FIG. 10 is an elevational view illustrating the magnetic clutch coupling between the turbine shaft and the non-linear generator shaft.

FIG. 9 and FIG. 10 show further details of the non-linear generators and the hook-up mechanism for a series of fans in each turbine module. Each non-linear generator functions to generate 60 cycle power at varying turbine speeds. In FIG. 9, four fan hubs 34 are illustrated for turbines A, B, C and D. Utilizing sprockets 36 on each one, there will be one sprocet on the shaft of turbine D, two sprocket on the shaft of turbine C, two sprockets on the shaft of turbine B and one sprocket on the shaft of turbine A. The sprockets are interconnected with high speed roller chains 37.

Non-linear generators are provided. The generator for turbine A is a mechanically connected generator, always in motion whenever the fans are in motion. The generators for turbines B and C are magnetically clutched and control panel 12 controls the magnetic clutches. When the turbine power reaches a point that generator 41 is at its peak output and reaches an overheating condition, the magnetic clutch will engage generator 41A. Should the wind power increase beyond the capacity of the 41 and 41a generators, the control panel will actuate the magnetic clutch on generator 41B thereby driving all three generators with four sets of fans.

The generators should be large enough to accumulate all of the energy output from a 90 MPH wind. Should the load drop, generator 41B would kick out first, then generator 41A, while generator 41 would always remain engaged to produce whatever energy was available even at small wind speeds.

FIG. 10 shows the generator mounted on bracket 42 which is attached to the main frame and the magnetic clutches inserted between the turbine output shaft and the generator shaft.

Reference will now be made to FIGS. 11 through 14. FIG. 14 is a top view of the torque frame 19 on which a separate set of frames 96 are slidably mounted and lead screw located to take power from the wind turbines and transmit it into kinetic energy on the kinetic fly wheel. The torque frame 19 is mounted by locating points 23 and 23A in the wall of the pit. These are adjustable so that sufficient down pressure can be devloped to transmit all the available torque load to the kinetic fly wheel without tire slippage.

Figure 12:
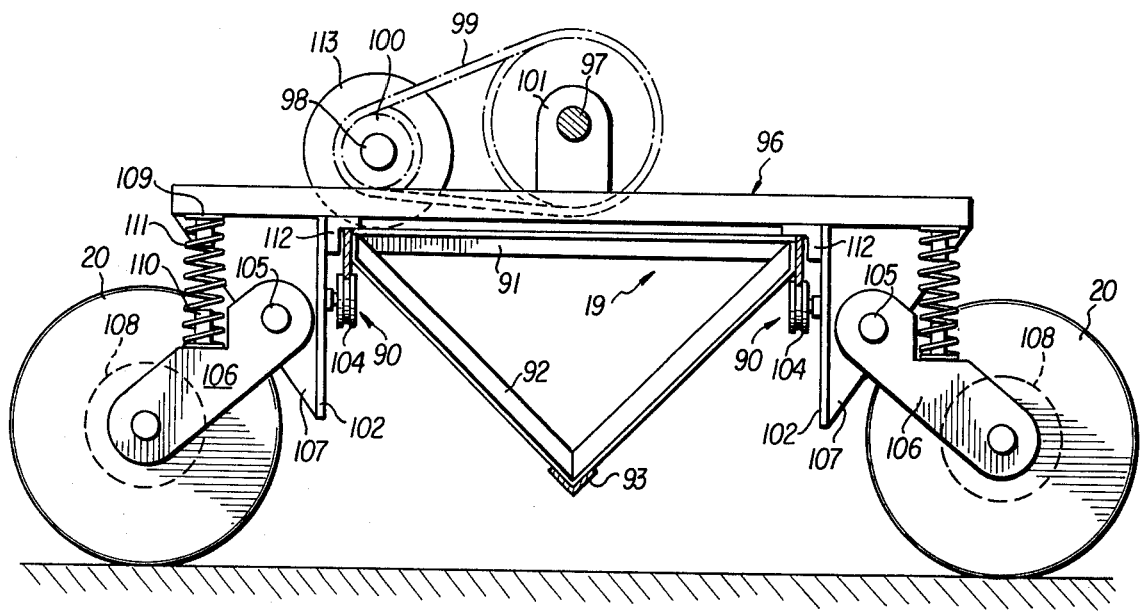
FIG. 12 is a side elevational view of the frame for directly supporting the drive wheels.
Figure 13:
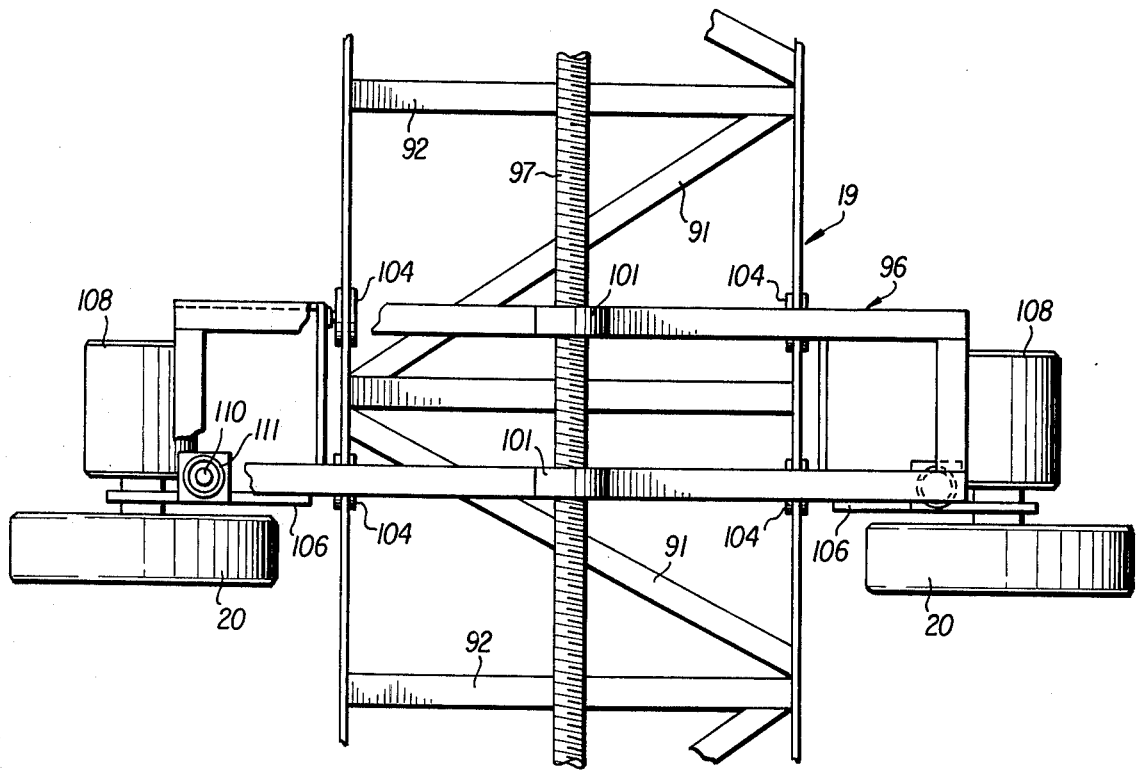
FIG. 13 is a top view of the frame for supporting the drive wheels.

FIG. 12 shows a bridge type frame 19 with a set of guide wheels 90 on each side that accept guide pads 112 on either side and rolling wheels 104 on the underside. The torque frame is a triangular member utilizing angle braces 91, down braces and lower strut 93. The torque frame is disposed around the riser 3 and has a frame section utilizing a ring 94 with surrounding brace members 95.

The drive frame is disposed astride of the torque frame, one on each end, located in its correct position from the center point by lead screws 97 for the left side 114 for the right side. These are driven by a counter shaft 98 which is driven by a shaft motor 113, under direction from control panel 12. An RPM timer is located on each motor 108 and indicates when the lead screw should be operated to move the wheels out toward the periphery or towards the center of the kinetic fly wheel.

The connector shaft or counter shaft 98 is connected to the lead screws through sprockets 100 and roller chain 99. The sprockets are mounted in brackets 101 with standard flangette bearings. Mounted on frame 96 is a wheel and turbine brakcet 102 which is braced by a frame gusset 107. The frame gusset has a period point 105 to which the wheel frame 106 is mounted The driving down-pressure on the wheel is generated by a shaft spring guide 110 with pivot ends 109 and a spring 111.

When the RPM counters on the kinetic motors 108 indicate maximum speed, the lead screws pull the drive wheels towards the center of the fly wheel to improve leverage and to reduce the RPM generating spin on the kinetic fly wheel. This procedure is reversed when energy is take out of the fly wheel through the wheels 20 which drive the reversible motor 108.

Figure 15:
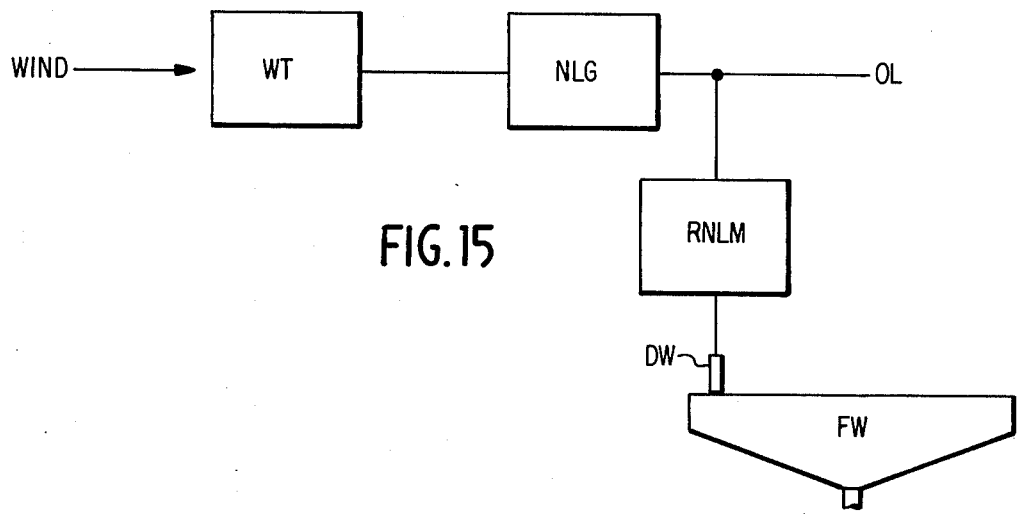
FIG. 15 is a block diagram showing the the conversion of wind power into electrical energy during periods of high and low wind velocity.

FIG. 15 is a block diagram showing the conversion of wind power into electrical energy during times of high wind velocity and low wind velocity. More particularly, during a time of adequate wind velocity, wind rotates wind turbing WT which drives non-linear generator NLG which produces electrical power over output line OL. Excess electrical power is transmitted to reversible non-linear motor RNLM which drives drive wheel DW which rotates fly wheel FW to kinetically accumulate the excess energy. During a time of low wind velocity, after kinetic energy has been stored in fly wheel FW, the rotation of fly wheel FW drives drive wheel DW which in turn reversible non-linear motor RNLM which produces electrical power which is transmitted over output line OL.

Figure 16:
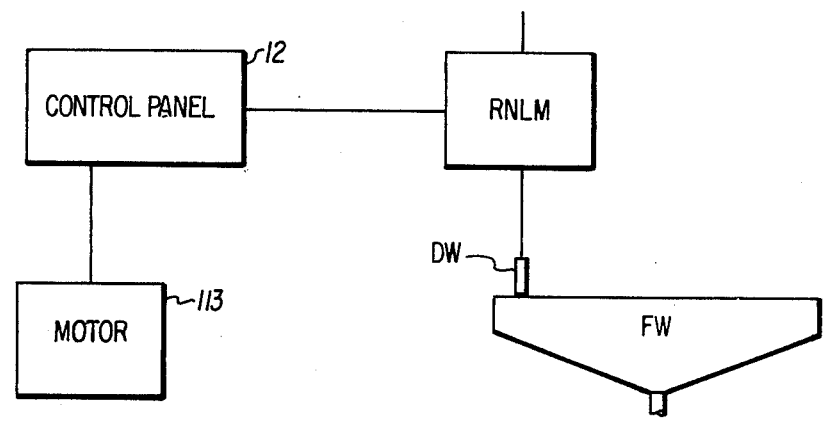
FIG. 16 is a block diagram showing the control for moving the drive wheels towards the center or towards the periphery of the fly wheel.

FIG. 16 shows the control of the position of drive wheel DW on fly wheel FW. If it is desired that the fly wheel FW rotate the drive wheel DW at the highest possible speed, drive wheel DW should be placed at the periphery of fly wheel FW since this is where the greatest surface velocity exists. This is achieved by having control panel 12 sense speed or reversible non-linear motor RNLM which is an indication of the speed of rotation wheel DW. If the speed of reversible non-linear motor RNLM is not as high as desired, motor 113 is actuated to move drive wheel DW towards the periphery of fly wheel FW by the mechanism shown in FIGS. 11–14. A similar but reverse operation is effected in a similar manner.

Figure 17:
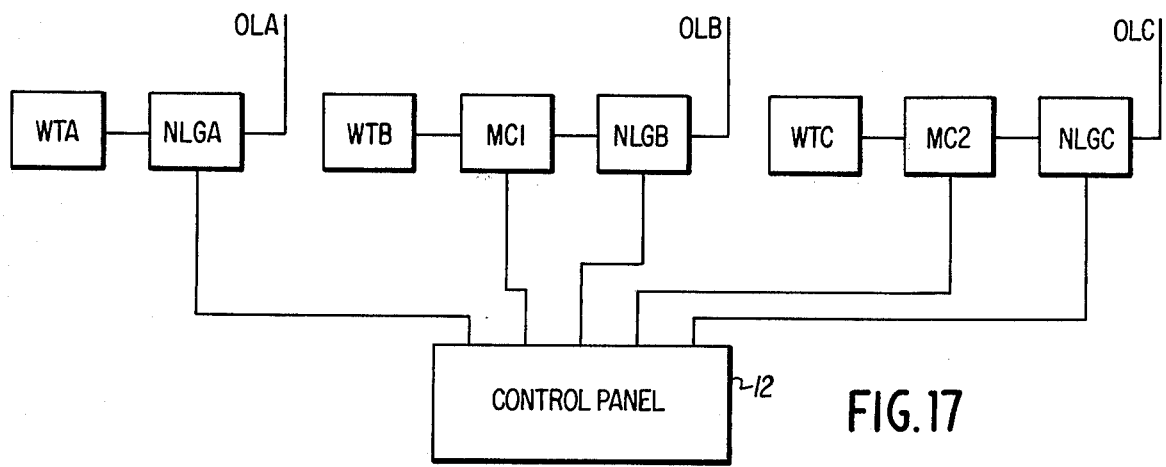
FIG. 17 is a block diagram showing the control for actuating and deactuating the magnetic clutches to either add or subtract additional turbines.

FIG. 17 is a block diagram of the controls in connection with A, B and C shown in FIG. 9. As shown in FIG. 17, wind turbine WTA is directly connected to non-linear generator NLGA to generate electrical power over output line OLA. Wind turbine WTB is connected to non-linear generator NLGB through magnetic clutch MC1. In like manner, wind turbine WTC is conneted to non-linear generator NLGC through magnetic clutch MC2. Non-linear generator NLGB generates electrical power over output line OLB. Non-linear generator NLGC generates electrical power over output line OLC.

NLGA, NLGB and NLGC are connected to control panel 12 so that control panel 12 is aware of the rotational speeds of NLGA, NLGB and NLGC. Control panel 12 is also connected to MC1 and MC2 in order to be able to engage and disengage MC1 and MC2 thereby coupling and uncoupling WTB and NLGB and WTC and NLGC.

When WTA reaches its maximum speed as indicated by NLGA, control panel 12 actuates MC1 to connect WTB to NLGB. When both WTA and WTB reach maximum speeds as indicated by NLGA and NLGB, control panel 12 actuates MC2 to connect WTC to NLGC.

Control panel 12 also controls operation in a reverse fashion to that set forth above. Thus, WTC can be disconnected from NLGC by deenergizing MC2 when the speed of WTC falls to a predetermined level. Similary, WTB can be disconnected from NLGB by deenergizing MC2 when WTB and WTC fall below predetermined speeds. WTA is always connected to NLGA to generate the electrical power supplied by the wind over OLA.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A high power wind turbine with kinetic accumulator comprising:
   a circular wall,
   a wind turbine movably mounted to the circular wall so that it can be moved to face the wind,
   a non-linear generator connected to the wind turbine to generate electrical power over an output line,
   a fly wheel,
   a drive wheel disposed in contact with the fly wheel to drive the fly wheel,
   a reversible non-linear motor connected to the drive wheel, to drive the drive wheel or to be driven by the drive wheel,
   means connecting the non-linear generator to the reversible motor to rotate the drive wheel to rotate the fly wheel to store energy therein when the non-linear generator generates excess electrical power, the rotating fly wheel to the extent it has stored energy therein rotating the drive wheel to drive the reversible motor to generate electrical power over the ouput line when the non-linear generator does not generate sufficient electrical power.

2. A high power wind turbine with kinetic accumulator as in claim 1 further including a second drive wheel disposed in contact with the flywheel to drive the flywheel and a second reversible non-linear motor connected to the non-linear generator and connected to the second drive wheel to drive the second drive wheel or to be driven by the second drive wheel.

3. A high power wind turbine with kinetic accumulator as in claim 2 wherein the wind turbine is movably mounted to the circular wall by at least two support wheels.

4. A high power wind turbine with kinetic accumulator as in claim 3 wherein each support wheel has a constant acting brake to prevent the wind turbine from being displaced with respect to the circular wall by a fishtailing wind.

5. A high power wind turbine with kinetic accumulator as in claim 4 wherein each wheel comprises a wheel axis, a needle bearing surrounding the wheel axis, an inside guide flange, an outside guide flange and a solid rubber tire between the inside and outside flanges.

6. A high power wind turbine with kinetic accumulator as in claim 5 wherein the constant acting brake comprises a support connected to the wheel axis, a constant drag brake connected to the support and to the inner surface of the outside guide flange, a secondary camming brake connected to the support and to the outer surface of the outside guide flange, a cam pad disposed between the constant drag brake, the support and the secondary camming brake, a pendulum connected to the secondary camming brake, a spring disposed about the secondary camming brake between the pendulum and the support to keep the brake retracted except during movement of the pendulum whereby a rapid motion from wind thrust causes the pendulum to grip the outside guide flange to restrict oscillatory motion to permit the wind turbine to face directly into the wind.

7. A high power wind turbine with kinetic accumulator as in claim 2 wherein the wind turbine comprises four wind turbine units connected to each other to rotate one output shaft connected to the non-linear generator.

8. A high power wind turbine with kinetic accumulator as in claim 7 wherein each wind turbine unit comprises a main frame, a wind cowling attached to the main frame, a turbine wheel rigidly connected to a hub which is rigidly connected to a turbine shaft which is joined to the main frame by a main bearing bracket holding two tapered bearings.

9. A high power wind turbine with kinetic accumulator as claim 8, wherein the turbine shaft is connected to the non-linear generator through a coupling and further comprising a sprocket rigidly connected to each turbine shaft and a chain connecting each of the sprockets.

10. A high power wind turbine with kinetic accumulator as in claim 9 wherein the cowling is inclined with respect to the turbine wheel and further comprising directional vanes, an outer ring for mounting the directional vanes to each other, a center directional cap, an inner ring for mounting the center directional cap to the directional vanes so that the maximum amount of wind pressure is directed towards the turbine wheel.

11. A high power wind turbine with kinetic accumulator as in claim 10 wherein the turbine wheel comprises an outer hoop and blades supported by the outer hoop and the hub.

12. A high power wind turbine with kinetic accumulator as in claim 2 further comprising means for supporting the first and second drive wheels equally spaced from the circular wall.

13. A high power wind turbine with kinetic accumulator as in claim 12 further comprising means for simultaneously moving the drive wheels along a diameter of the circular wall to either increase or decrease the distance between each drive wheel and the circular wall.

14. A high power wind turbine with kinetic accumulator as in claim 13 wherein the drive wheels are simultaneously moved along a diameter of the circular wall away from the circular wall when the rotational speed of the drive wheels exceeds a predetermined amount.

15. A high power wind turbine with kinetic accumulator as in claim 13 wherein the drive wheels are simultaneously moved along a diameter of the circular wall towards the circular wall when the rotational speed of the drive wheels falls below a predetermined amount.

16. A high power wind turbine with kinetic accumulator as in claim 12 further comprising means to engage and disengage the first and second drive wheels with respect to the flywheel by moving the first and second drive wheels in a direction parallel to the axis of the flywheel.

17. A high power wind turbine with kinetic accumulator as in claim 12 further comprising a first frame for supporting the first drive wheel, a second frame for supporting the second drive wheel, the first frame being mounted to a first lead screw, the second frame being mounted to a second lead screw, means to simultaneously rotate the first and second lead screws to cause the first and second frames to simultaneously move toward the circular wall or to simultaneously move toward the center of the circular wall.

18. A high power wind turbine with kinetic accumulator as in claim 17 wherein the means to simultaneously rotate comprises a motor connected to a counter shaft which is connected by sprockets and roller chains to the first and second lead screws.

19. A high power wind turbine with kinetic accumulator as in claim 18 wherein the first and second frame are supported by a main frame.

20. A high power wind turbine with kinetic accumulator as in claim 19 wherein the circular wall is joined to a floor, a centrally located riser connected to the floor, the riser supporting the main frame.

21. A high power wind turbine with kinetic accumulator as in claim 20 wherein the main frame comprises a ring connected to the riser, surrounding brace members connected to the ring, the main frame further comprising interconnected angle braces, down braces and a lower strut.

22. A high power wind turbine with kinetic accumulator as in claim 21 further comprising two down braces connecting the lower strut and the first frame, first and second support members connected to the first frame at first and second pivot points, first and second shaft spring guides connected between the first frame and the first and second support members respectively, first and second springs disposed about the first and second shaft spring guides to urge the first and second support members to pivot about the first and second pivot points, the first reversible motor being connected to the first support member, a second first frame member, the reversible motor being connected to the first drive wheel, the second first frame mounted reversible motor being connected to a second first frame mounted drive wheel, the first and second springs urging the first drive wheel and the second first frame mounted drive wheel into contact with the fly wheel.

23. A high power wind turbine with kinetic accumulator as in claim 22 further comprising first and second wheel and turbine brackets connected to the first frame, first and second frame gussets mounted to the first frame to support the first and second wheel and turbine brackets, first and second rolling wheels haveing axles mounted to the first and second rolling wheels haveing axles mounted to the first and second wheel and turbine brackets, first and second guide wheels disposed in contact with the first and second rolling wheels and with the first frame and first and second guide pads each disposed in contact with the first frame between the first and second wheel and turbine brackets and the first and second guide wheels, respectively.

24. A high power wind turbine with kinetic accumulator as in claim 2 further comprising means supporting the fly wheel within the circular wall, the fly wheel and the circular wall being concentric.

25. A high power wind turbine with kinetic accumulator as in claim 24 wherein the wind turbine is rotatably joined to a pivot which is rigidly connected to a riser which is concentric with the fly wheel.

26. A high power wind turbine with kinetic accumulator as in claim 25 wherein the wind turbine is rotatably joined to the pivot by a frame member, a bracket connected to the bracket, a plurlity of slip rings carrying electrical power from the non-linear generator connected to the plurality of carbon brush slides, a plurality of insulators disposed adjacent to the pivot, a plurality of collecting rings disposed intermediate the plurality of carbon brush slides and the plurality of insulators, a plurality of wires connected to the plurality of collecting rings to carry away electrical power from the non-linear generator.

27. A high power wind turbine with kinetic accumulator as in claim 2 wherein the circular wall is concrete and is joined to a concrete floor, a centrally located riser flanged to the concrete floor, the fly wheel being joined to the riser by a radial bearing at the top of the fly wheel and by a thrust bearing at the bottom of the fly wheel.

28. A high power wind turbine with kinetic accumulator as in claim 2 further comprising means for transmitting electrical power generated by the non-linear generator to a collecting ring and then to an exit cable.

29. A high power wind turbine with kinetic accumulator as in claim 2 further including three additional wind turbines, two additional non-linear generators each connected to a separate wind turbine, a first high speed roller chain for connecting the first turbine to the second turbine, a second high speed roller chain for connecting the second turbine to the third turbine and a third high roller chain for connecting the third turbine to the fourth turbine.

30. A high power wind turbine with kinetic accumulator as in claim 29 further comprising a turbine shaft for each turbine and a generator shaft for each non-linear generator, the first turbine shaft being uninterruptedly connected to the first generator shaft, the second turbine shaft being connected to the second generator shaft by a first magnetic clutch, the third turbine shaft being connected to the third generator shaft by a second magnetic clutch, the first and second magnetic clutches being normally disengaged, control means to engage the first magnetic clutch when the first turbine shaft reaches a predetermined speed and to engage the second magnetic clutch when the first and second turbine shafts reach predetermined speeds.

31. A high power wind turbine with kinetic accumulator as in claim 30 further comprising a first sprocket rigidly connected to the first turbine shaft, a second sprocket rigidly connected to the second turbine shaft, a third sprocket rigidly connected to the second turbine shaft, a fourth sprocket rigidly connected to the third turbine shaft, a fifth sprocket rigidly connected to the third turbine shaft, a sixth sprocket rigidly connected to the fourth turbine shaft, the first and second sprockets being connected by the first high speed roller chain, the third and fourth sprockets being connected by the second high speed roller chain and the fifth and sixth sprockets being connected by the third high speed roller chain.

32. A high power wind turbine with kinetic accumulator as in claim 30 wherein the control means disengages the second magnetic clutch when the third turbine shaft falls to a predetermined speed and disengages the first magnetic clutch when the second turbine shaft falls to a predetermined speed.

* * * * *